Aug. 19, 1924.
F. W. EPPERSON
FROZEN CONFECTIONERY
Original Filed June 11, 1924
1,505,592
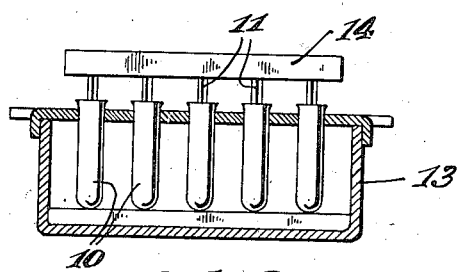
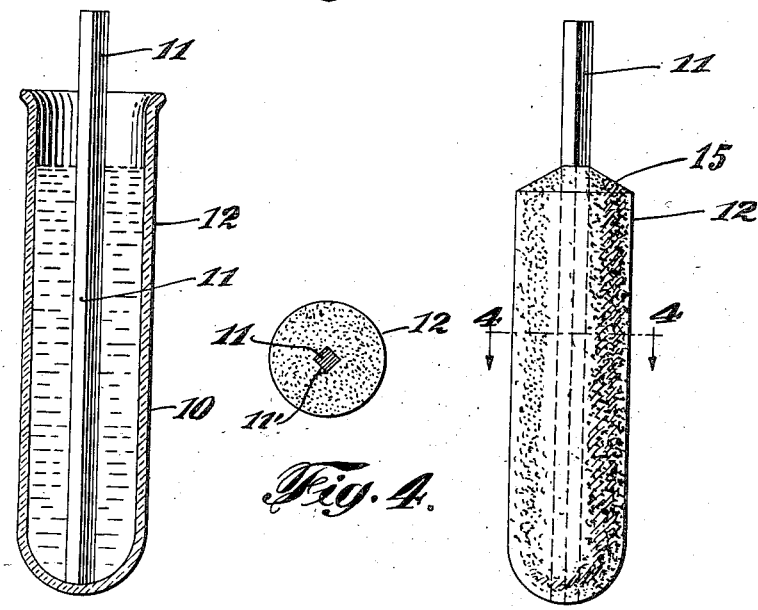
INVENTOR
Frank W. Epperson
BY
his ATTORNEYS Patented Aug. 19, 1924.

1,505,592

UNITED STATES PATENT OFFICE.

FRANK W. EPPERSON, OF OAKLAND, CALIFORNIA.

FROZEN CONFECTIONERY.

Original application filed June 11, 1924, Serial No. 719,295. Divided and this application filed July 19, 1924. Serial No. 726,950.

*To all whom it may concern:*

Be it known that I, FRANK W. EPPERSON, a citizen of the United States, and resident of Oakland, in the county of Alameda and State of California, have invented certain new and useful Improvements in Frozen Confectionery, of which the following is a specification.

It is among the objects of the invention to provide a method or process for making a frozen confection of attractive appearance, which can be conveniently consumed without contamination by contact with the hand and without the need for a plate, spoon, fork or other implement, which process can be expeditiously carried out at small expense with simple apparatus, without the need for expert care and in thoroughly sanitary manner.

In the preferred method for making the confection, small containers which may be ordinary test tubes are charged with the liquid syrup from which the confection is frozen and the handle sticks are inserted thereinto and pressed down into contact with the bottoms of the containers, to overcome the buoyant effect of the liquid. The syrup is then subjected to intense refrigeration, so that it is frozen solid within a few minutes. The test tube, confection and stick are thus frozen together into a rigid mass, from which the test tube container is removed by drawing outward on the handle after slightly loosening the container from the confection.

It is preferred in this connection to employ a stick of relatively sapless or tasteless porous wood, which will become soaked with the syrup at the outset, so that the frozen mass will not only be frozen about, but through the stick, the more firmly or intimately to be combined therewith. By this arrangement, especially where the stick extends the entire length of the confection, the confection will remain a unit with the stick even under the relatively high tension required in withdrawal from the test tube against the vacuum thus generated.

This application is a division of my copending application, Serial No. 719,295, filed June 11, 1924, which, in turn, is a continuation in part as to all common subject-matter of my earlier copending application, Serial No. 622,830, filed March 5, 1923.

In the accompanying drawings, in which is shown one of various possible embodiments of the several features of the invention, Fig. 1 is a view in longitudinal cross-section illustrating the relation of the parts when refrigeration is about to commence, Fig. 2 is a view on a small scale illustrating the arrangement of the units in the refrigerating machine, Fig. 3 is a side elevation of the completed confection, and;

Fig. 4 is a view in transverse cross-section taken along the line 4—4 of Fig. 3.

Referring now to the drawings, I have shown a mold in the form of a small cylindrical smooth-walled vessel having an imperforate bottom and side wall, which may be an ordinary test tube 10, in which is placed a stick 11 preferably non-circular, illustratively square in cross-section as at 11'. The tube is partly or wholly filled with a syrup 12 of any flavor, preferably mainly water with suitable proportions of flavoring matter, natural or synthetic, and sugar. In the preferred manner of carrying out the invention, a dozen or more of the units shown in Fig. 1 are mounted in a single refrigerating chamber 13, as indicated diagrammatically in Fig. 2 for simultaneous congelation. In order to maintain the various sticks in contact with the bottoms of the test tubes or other containers, against the buoyant effect of the syrup therein, an appropriate weight such as a board 14 presses down upon the tops of the various sticks 11 which protrude well above the containers. It is preferred to operate the machine for refrigeration at such intensity that the congelation of the syrup in the containers is completed in from two to six minutes. In the expansion due to freezing, the edible mass will tightly engage or grip both the container 10 and the stick 11 and will protrude in the manner of a cone 15 at the upper end.

The stick by its polygonal cross-section and by the fact that it extends the entire length of the confection is effectively keyed with respect to the edible constituent. Moreover, the mass in freezing expands into any small irregularities in the stick surface, further performing a keying action.

It is preferred to employ a wooden stick of relatively porous though sapless and, therefore, tasteless wood—bass, birch and poplar being found most suitable for the purpose. By the use of wood of this character, the syrup at the outset completely permeates or soaks through the stick and in refrigeration, the confection is frozen not only about the stick, but through the body of the stick, so that it is most intimately united therewith.

The frozen product may be generically designated a water ice or sherbet, although it presents certain differences from the substances generally known by these names. The congelation of the syrup maintained in quiescent condition during freezing, as distinguished from the manufacture of other confections which are agitated during congelation, results in a more or less crystalline product of hard snowy consistency, where the latter confections are of the familiar homogeneous creamy consistency of ordinary ice cream, water ice or sherbet.

The containers standing vertically in the refrigerating machine and having a depth of several inches, rapid refrigeration results in a more uniform and homogeneous product than would a slow freezing action. Although the original syrup used is preferably an emulsion which will not stratify, yet were the refrigeration action to proceed slowly, it would follow that the water constituent freezing first, and tending to float on the top, the heavier sugar and flavoring constituent would tend to drop to the bottom, rendering the product highly flavored at the bottom and almost flavorless at the top. By my mode of rapid congelation, the substantially homogenous confection is completed before any such separation can take place.

After the freezing operation is completed, the rigid unit consisting of the container, the frozen mass and the stick is removed from the refrigerating chamber and by immersion of the container in luke warm water, for instance, the surface of the frozen mass will become slightly loosened with respect to the smooth wall of the container and thereupon by grasping the container in one hand and the handle in the other and pulling on the handle, after preferably giving the handle a slight turn, the confection will be withdrawn therewith, intact from the container. It will be noted that a substantial tensile force is required to withdraw the confection, inasmuch as the confection operates as a relatively air-tight piston in its travel from the container forming substantially a vacuum therebehind.

If the handle and core were not connected to the confection with sufficient security, to resist such substantial pull, it is obvious that in the operation of removal, it would be drawn out of the confection in the tensile action, rather than to withdraw with it the confection from the imperforate mold wall and bottom. It will be noted that the tensile force is applied throughout the length of the stick, which extends the length of the confection, and is distributed over the substantial area of the confection contacting the container. If the stick extended only part of the length of the confection, unless the latter were frozen particularly hard or after freezing were first loosened sufficiently with respect to the mold wall to require but little tensile force for withdrawal, the part beyond the stick and not reinforced thereby, might readily break off under the tension exerted in withdrawal. Moreover, where, as just noted, the frozen confection must be heated substantially, or for many seconds, much of the flavoring material will melt away and remain in the mold after subsequent withdrawal of the confection.

The cold mass withdrawn from the highly polished inner surface of the tube, has a relatively hard and polished surface, upon which the moisture from the atmosphere will condense in the manner of hoar frost, as it is held in the hand preparatory to eating, thereby enhancing the beauty of the confection. In the evaporation of any such condensed moisture on the surface of the confection, heat may be abstracted from the edible mass, which possibly accounts for the fact that the confection remains solid for many minutes though exposed to warm temperature.

It will be understood that by reason of the fact that the water constituent will freeze at higher temperature than the flavoring constituent, the latter will freeze last in the refrigerating chamber and will melt first after removal from said chamber. As a corollary, the confection may be consumed by sucking thereon in which operation, the chilled more or less concentrated flavoring constituent will be drawn into the mouth as a refreshing drink derived from the solid on the stick, leaving a white and colorless mass of ice or snow, although, of course, the confection can be eaten in its entirety from the stick.

It will be understood that, were the frozen constituent not so intimately associated or keyed with respect to the handle or stick, there is a likelihood that it might slip off therefrom preparatory to eating, or that if the core did not extend the complete length of the confection, but only partly thereinto as in ordinary candy suckers, the part protruding beyond the core or stick being devoid of the sustaining core, might readily break off and drop away unless carefully handled.

The wooden handle is an insulator of heat and will, therefore, neither conduct the cold of the confection to the hand of the consumer, nor the heat of the hand to the confection. The confection can be eaten without the annoying and unsanitary operation of removing a closely adhering wrapper and without the need for handling the confection at all.

While the circular cylindrical form shown in the drawings is preferred, it will be understood that the term "cylindrical" in a mathematical sense is generic to other forms, and is so used.

It will thus be seen that there is herein described a method in which the several features of this invention are embodied, and which attains the various objects of the invention and is well suited to meet the requirements of practical use.

As many changes could be made in the above method, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent of the United States is:

1. The process which consists in subjecting a quiescent volume containing potable liquid, flavoring matter and sugar and of substantial height relative to its bass dimensions, to intense refrigeration, whereby a frozen mass is formed homogeneous from end to end of character such that the flavoring matter and sugar may be sucked therefrom to leave a tasteless mass of snow or ice.

2. The process of preparing a frozen confection, which consists in immersing a combined handle and sustaining member through substantially the entire height of a potable substance and subjecting the same to refrigeration, whereby it is solidified by congelation to the solid sustaining member extending the entire length thereof.

3. The process of making a frozen confection which consists in immersing a stick into syrup in a vessel and subjecting the vessel to intense refrigeration, whereby the liquid is frozen intimately and homogeneously about and along the stick.

4. The process of making a frozen confection which consists in charging a generally cylindrical container, such as a test tube with a syrup in liquid form, inserting a handle stick thereinto and subjecting the liquid to refrigeration, effecting loosening of the surface of the frozen confection thereby formed with respect to the container wall and drawing it therefrom by the handle stick.

5. The process of making a frozen confection, which consists in charging a generally cylindrical container, such as a test tube, with a syrup in liquid form, inserting a stick thereinto to substantially contact the bottom thereof and to protrude from the top, and subjecting the liquid to refrigeration, loosening the surface of the frozen confection, thereby formed with respect to the container wall and drawing it therefrom by the handle, whereby the handle in the withdrawing operation, constitutes a core upon which the tension is exerted without breaking the frozen mass and serves as a core to maintain the mass intact preparatory to and during consumption.

6. The process of making a frozen food product, which consists in charging a generally cylindrical container having a closed bottom, such as a test tube, with a potable flavored substance, inserting a porous rigid core thereinto, protruding from the surface of the substance, subjecting the substance to refrigeration, effecting loosening of the surface of the frozen product thereby formed with respect to the container to a degree insufficient to permit the ready entry of air therebetween, and pulling upon the handle to withdraw the product therewith against the vacuum thereby engendered in the container.

7. The process of making a frozen confection which consists in charging a generally cylindrical container having a closed bottom, such as a test tube, with the substance to be congealed, inserting a handle stick thereinto, and subjecting the substance to refrigeration to cause an intimate bond with the stick, effecting loosening of the surface of the frozen confection thereby formed with respect to the container to a degree insufficient to permit the ready entry of air therebetween, and pulling upon the handle to withdraw the confection therewith against the vacuum thereby engendered in the container.

Signed at Oakland, in the county of Alameda and State of California, this 15th day of July, A. D. 1924.

FRANK W. EPPERSON.